No. 615,655. Patented Dec. 6, 1898.
J. H. PARKS.
PERMUTATION LOCK.
(Application filed Feb. 16, 1898.)
(No Model.)
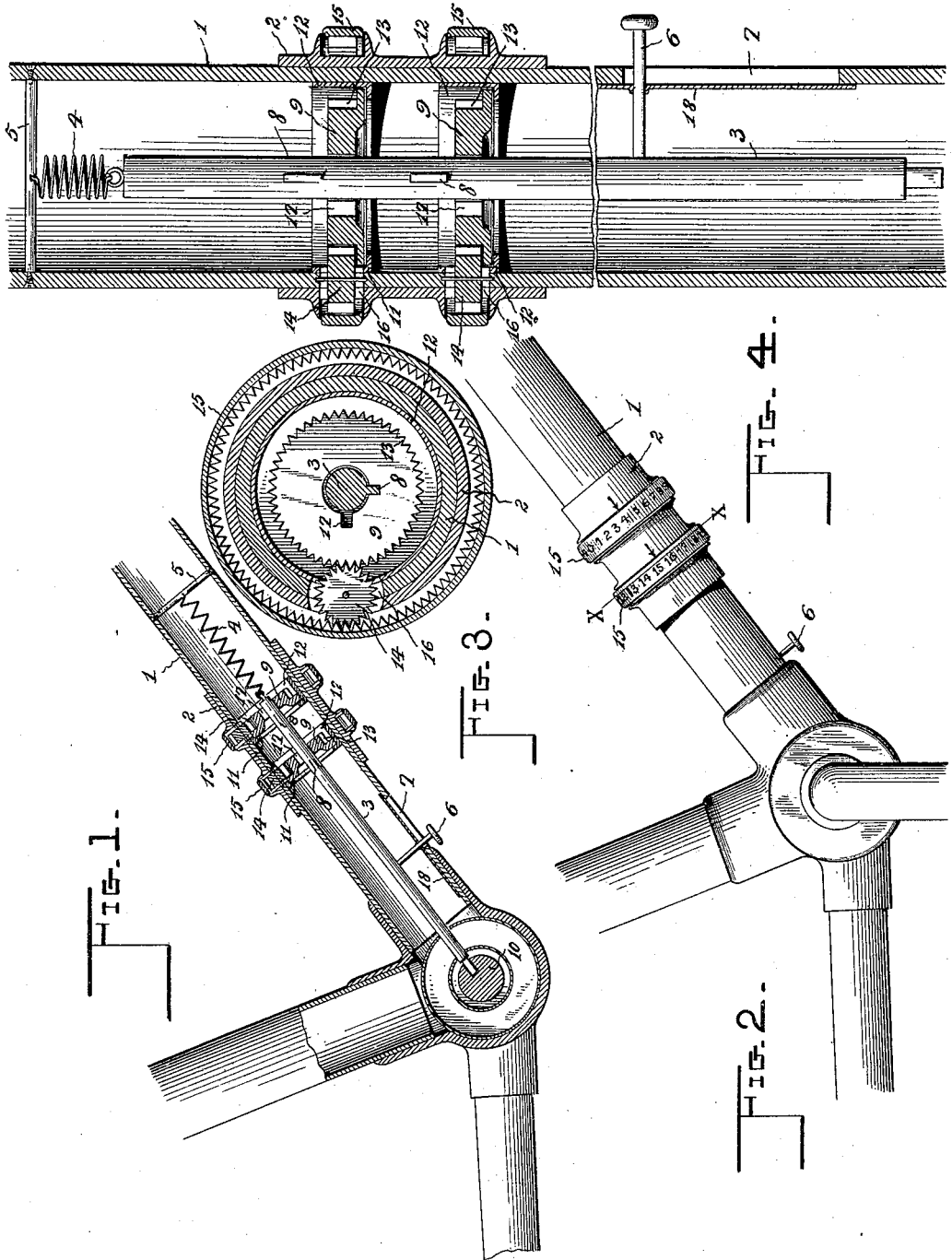
Witnesses
John F. Deufferwiel
V. B. Hillyard.
James H. Parks, Inventor
By his Attorneys,
C. A. Snow & Co.
THE NORRIS PETERS CO., PHOTO-LITHO., WASHINGTON, D. C.

UNITED STATES PATENT OFFICE.

JAMES H. PARKS, OF CRIPPLE CREEK, COLORADO, ASSIGNOR OF ONE-FOURTH TO ARTHUR KNECHT AND J. K. BREWSTER, JR., OF SAME PLACE.

PERMUTATION-LOCK.

SPECIFICATION forming part of Letters Patent No. 615,655, dated December 6, 1898.

Application filed February 16, 1898. Serial No. 670,527. (No model.)

*To all whom it may concern:*

Be it known that I, JAMES H. PARKS, a citizen of the United States, residing at Cripple Creek, in the county of El Paso and State of Colorado, have invented a new and useful Permutation-Lock, of which the following is a specification.

The present invention relates to a lock of the keyless type provided with a series of tumblers which are adapted to be brought into a definite and predetermined relation in order to admit of the part to which the lock is applied being released or secured.

The object of the invention is to provide a lock of this variety especially adapted to be applied to bicycles and machines of kindred nature to prevent theft thereof when left standing and not under the eye of the rider.

To this end the invention consists of a longitudinally-movable bolt arranged within one of the tubes of the frame of a bicycle and adapted to engage the axle, being operated exteriorly of the tube and provided with a permutation-lock mechanism for said bolt also inclosed within the tube and operated exteriorly to hold the bolt in engagement with the axle, and thus lock the bicycle against unauthorized use.

While the lock is particularly adapted for use in the manner aforesaid, because advantage is taken of a tubular frame-bar for forming a casing for the operating parts, it is to be understood that the lock is designed for universal application wherever a fastening means of this nature is susceptible of use, the tubular frame-bar being substituted by a suitable casing, and the latter is contemplated in the practicalizing of the invention.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a longitudinal section of the crank-hanger of a bicycle of the safety type, showing the relation of the parts comprising the lock. Fig. 2 is a view in elevation of the tubular frame-bar or casing and the parts constituting the lock. Fig. 3 is a transverse section on the line X X of Fig. 2. Fig. 4 is a vertical or longitudinal section on a larger scale.

Corresponding and like parts are referred to in the following description and indicated in all the views of the drawings by the same reference characters.

When applied to a bicycle or other machine, the lock will be disposed to admit of the bolt engaging with the part to be secured and the frame-bar will constitute the casing. As indicated in the drawings, the lock is located in proximate relation to the crank-hanger, so as to secure the crank-axle against rotation when the machine is left unattended. One of the frame-bars, as 1, has the parts comprising the lock applied thereto, and having openings in its side is made heavier or reinforced, as shown at 2, to compensate for the metal removed in providing the openings. The reinforcement 2 is preferably a sleeve or cuff applied to the tube 1, and openings are formed therein in coincident relation with the openings in the said tube 1. The bolt 3 is centrally disposed and is held out of action by means of a spring 4, which connects it with a pin or support 5, secured within the tube 1 a proper distance from the active end of the bolt 3. A pin 6 projects laterally from the bolt 3 and passes through a slot 7 in the tube 1, and its projecting end is adapted to be grasped when it is required to operate the lock. Lugs 8 project from the bolt 3 and coöperate with tumblers 9 to secure the bolt when projected into the part to be secured, which in the present instance is the crank-axle 10, the latter having a notch or depression into which the reduced end of the bolt 3 is shot when the axle is held fast.

There may be one or a series of locking-tumblers, according to the desired permutation, and when more than one tumbler is employed the others will be of duplicate construction. Hence it is only necessary to give a detailed description of one in order that the lock may be understood in all of its essential features and operation. The tumbler 9 is rotatably supported upon an inner flange or shoulder 11 of a ring 12, secured within the tube or casing 1, and has a toothed portion 13 formed with or applied to its upper side. An idle-pinion 14 is mounted upon a pin projecting vertically across an opening 16, formed in one side of the tube 1, and is in mesh with the toothed portion 13 of the tumbler 9 and transmits motion thereto from an operating-ring 15, encircling the tube or casing 1 and internally toothed, and having its toothed portion intermeshing with the said idle-pinion 14. As is obvious, the pinion 14 is located in an opening 16, formed in a side of the tube or casing 1, and projects beyond the inner and outer sides of the said tube to mesh with the toothed portions of the tumbler and operating-ring. The tumbler 9 has a central opening through which the bolt 3 is adapted to slide, and a notch 17 extends from this opening, and it is of a size to admit of the lug 8 passing therethrough when the parts 8 and 17 are brought into register. The operating-ring 15 is provided with a series of symbols or characters, by means of which it can be properly positioned, so as to bring the notch 17 of the tumbler 9 into register with the lug 8, so as to admit of the withdrawal of the bolt 3 from the part secured thereby when required.

As clearly indicated, the tumbler is of circular form and is supported upon the inner shoulder or flange 11 and is prevented from vertical displacement by means of the idler 14, which extends over the marginal portion thereof. The slot or opening 7, through which the pin 6 passes and operates, is closed by the plate 18, mounted upon the pin 6 and movable therewith, thereby excluding dust, wet, and foreign matter from the interior of the tube.

Having thus described the invention, what is claimed, and desired to be secured by Letters Patent, is—

1. In combination with the crank-axle of a bicycle, the longitudinally-movable bolt adapted to engage at one end the axle and arranged within one of the tubes of the bicycle-frame, said bolt being operated from the exterior of the tube, and a permutation-lock mechanism for said bolt, also inclosed within the tube around the bolt, and operated exteriorly to hold the bolt into engagement with the axle, substantially as set forth.

2. In a permutation-lock, the combination of a tube or casing, a centrally-disposed bolt, a ring secured within the tube and having an inner flange or shoulder, a tumbler supported upon the flange or shoulder of the ring and having a toothed portion, an operating-ring encircling the said tube and internally toothed, means for preventing longitudinal movement of the tumbler, and an idle-pinion intermeshing with the toothed portions of the operating-ring and tumbler, substantially as set forth.

3. In a permutation-lock, the combination of a tube or casing provided with an inner shoulder, a centrally-disposed bolt, a circular tumbler mounted upon the said inner shoulder and having its middle portion raised and toothed, an idle-pinion mounted in an opening in the side of the tube or casing and extending over the outer portion of the tumbler and intermeshing with the toothed portion thereof, and an operating-ring encircling the tube and internally toothed and having its toothed portion meshing with the aforesaid pinion, substantially as described.

4. In a bicycle or like machine, the combination of a tubular frame-bar having openings in a side thereof and having the portion formed with the openings reinforced, a bolt having an operating-pin projecting through one of the said openings, a spring for normally holding the bolt out of action, a ring secured within the tube and having an inner flange or shoulder, a tumbler supported upon the shoulder or flange of the ring and provided with a toothed portion, an operating-ring encircling the tube and internally toothed, means for preventing longitudinal movement of the tumbler, and an idle-pinion mounted in one of the openings of the tube and intermeshing with the toothed portions of the tumbler and operating-ring, substantially as and for the purpose set forth.

5. In a permutation-lock, the combination of a bolt, tumblers, and concentrically-disposed exteriorly-operated rings, separate for each tumbler, the rings and tumblers having opposing portions correspondingly toothed, and idle-pinions, each pinion intermeshing with the toothed portions of its respective tumbler and ring, to transmit motion from the latter to the former independently of the other tumblers, substantially as set forth.

6. In a permutation-lock, the combination of a tube or casing provided with an opening in the side thereof, and with guide-flanges arranged at each side of the opening, a bolt, a tumbler, an operating-ring mounted between said flanges and covering the opening, and an idle-pinion mounted within the opening and engaging the operating-ring and the tumbler, whereby motion is transmitted to the latter, substantially as shown and described.

In testimony that I claim the foregoing as my own I have hereto affixed my signature in the presence of two witnesses.

JAMES H. PARKS.

Witnesses:
OWEN A. ROWE,
J. M. BRINSON.